(12) United States Patent
Ihm et al.

(10) Patent No.: US 8,594,218 B2
(45) Date of Patent: Nov. 26, 2013

(54) METHOD OF TRANSMITTING A PRECODING MATRIX IN A MULTI-INPUT MULTI-OUTPUT (MIMO) SYSTEM

(75) Inventors: Bin Chul Ihm, Gyeonggi-do (KR); Yong Suk Jin, Gyeonggi-do (KR); Jin Young Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 606 days.

(21) Appl. No.: 11/718,092

(22) PCT Filed: Nov. 1, 2005

(86) PCT No.: PCT/KR2005/003649
§ 371 (c)(1),
(2), (4) Date: Aug. 4, 2009

(87) PCT Pub. No.: WO2006/049417
PCT Pub. Date: May 11, 2006

(65) Prior Publication Data
US 2009/0296844 A1     Dec. 3, 2009

(30) Foreign Application Priority Data

Nov. 1, 2004 (KR) .......................... 10-2004-0087968

(51) Int. Cl.
*H04B 7/02* (2006.01)
(52) U.S. Cl.
USPC ........... 375/267; 375/260; 375/299; 375/347; 375/349
(58) Field of Classification Search
USPC .......................... 375/267, 260, 299, 347, 349
See application file for complete search history.

(56) References Cited

U.S. PATENT DOCUMENTS

2005/0101259 A1* 5/2005 Tong et al. ................. 455/69
2006/0039489 A1* 2/2006 Ikram et al. ................. 375/260

FOREIGN PATENT DOCUMENTS

| CN | 1171686 | 1/1998 |
| CN | 1395779 | 2/2003 |
| WO | 2004-047340 | 6/2004 |
| WO | WO 2004/064311 A1 | 7/2004 |

OTHER PUBLICATIONS

Khan, M.Z.A; Rajan, B.S.; Space-Time Block Codes from Cordinate Interleaved Orthogonal Designs. In: IEEE International Symposium on Information Theory, 2002. ISIT 02. Proceeding. Lausanne, Switzerland, Jun. 30-Jul. 5, 2002 p. 275.
Zafar, et al., "Space-Time Block Codes from Co-ordinate Interleaved Orthogonal Designs", IEEE International Symposium on Information Theory, XP010601986, Jun. 2002.
Santipach, et al., "Achievable Rates for MIMO Fading Channels With Limited Feedback and Linear Receivers", IEEE Eighth International Symposium, XP010754897, Aug. 2004.
In the European Patent Office Application Serial No. 05804497.5, Search Report dated Nov. 13, 2012, 9 pages.

* cited by examiner

*Primary Examiner* — Kabir A Timory
(74) *Attorney, Agent, or Firm* — Lee, Hong, Degerman, Kang & Waimey

(57) ABSTRACT

A method of transmitting a precoding matrix in a multi-input, multi-output (MIMO) system is disclosed. In the system, a receiving end determines feedback information by calculating each diagonal sub-matrix of the precoding matrix. Here, the precoding matrix includes a plurality of sub-matrices arranged in a block diagonal format. Thereafter, the receiving end transmits he feedback information of the each calculated sub-matrix.

5 Claims, 3 Drawing Sheets

{Index of element most similar to $a_i, b_i, i=1,2,...,M/2$}

US 8,594,218 B2

METHOD OF TRANSMITTING A PRECODING MATRIX IN A MULTI-INPUT MULTI-OUTPUT (MIMO) SYSTEM

CROSS-REFERENCE TO RELATED APPLICATIONS

This application is the National Stage filing under 35 U.S.C. 371 of International Application No. PCT/KR2005/003649, filed on Nov. 1, 2005, which claims the benefit of earlier filing date and right of priority to Korean Application No. 10-2004-0087968, filed on Nov. 1, 2004.

TECHNICAL FIELD

The present invention relates to a method of transmitting a precoding matrix, and more particularly, to a method of transmitting a precoding matrix in a multi-input, multi-output (MIMO) system.

BACKGROUND ART

FIG. 1 is an example illustrating a multi-input, multi-output (MIMO) system according to the related art. As illustrated in FIG. 1, in operation, the receiving end uses a channel matrix H to determine a precoding matrix W and transmits (or feeds back) the determined precoding matrix to the transmitting end. At the same time, the transmitting end and the receiving end both possesses a set of matrices, one of which matches or is most similar to the determined precoding matrix W. Thereafter, the receiving end transmits (or feeds back) the index of the matrix which matches or is most analogous to the determined precoding matrix W. Here, the set of indexes corresponding to each of the analogous matrices are referred to as a codebook.

If the transmitting end and the receiving end use the shared codebook to feed back the index corresponding to the W matrix, the W matrix is determined based on the number of transmitting and receiving antennas. Subsequently, if the number of transmitting and receiving antennas increases, the number of W, which comprises the codebook, increases exponentially. In other words, the value of W is not fed back to the transmitting end, and rather, it is the index of the W value most similar or analogous to the actual W value which is fed back. As such, even a small increase in the number of antennas relates to a large increase in the number of W values in the codebook.

For example, if W matrix is a 2×2 matrix, the W matrix includes 4 elements. Therefore, even if there are 8 matrices included in the codebook comprises of these combinations, it is not difficult to find a matrix most similar to the actual W matrix. Furthermore, the performance drop is not significant.

In addition, if W matrix is a 4×4 matrix, for example, there are 16 elements in the W matrix. If there are only 8 matrices, as is the case with the 2×2 matrix, and if the W matrix most analogous to the actual W matrix is selected, there would be much difference between the actual W matrix and the W matrix selected from the codebook. Furthermore, if the index of the W matrix is transmitted to the transmitting end, the transmitting end receives the W matrix which is much different from the actual W matrix. Consequently, the performance could suffer. Furthermore, if the W matrix is a 4×4 matrix, there should be at least 64 matrices in the codebook to minimize performance drop.

Here, the number of bits transmitted from the transmitting end not only changes according to the number of antennas, but also has to have a storage (memory) which should be able to store more than 64 matrices, making it inefficient. At the same time, because the number of reserve W matrices increase exponentially with the increase of the transmitting and receiving antennas, it is difficult to prepare for subsequent increase in number of antennas.

DISCLOSURE OF INVENTION

Accordingly, the present invention is directed to a method of transmitting a precoding matrix in a multi-input, multi-output (MIMO) system that substantially obviates one or more problems due to limitations and disadvantages of the related art.

An object of the present invention is to provide a method of transmitting a preceding matrix more efficiently.

Another object of the present invention is to provide a method of transmitting a precoding matrix using less memory.

A further object of the present invention is to provide a method of receiving a precoding matrix in a MIMO system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a precoding matrix in a multi-input, multi-output (MIMO) system includes a receiving end which determines feedback information by calculating each diagonal sub-matrix of the preceding matrix. Here, the preceding matrix includes a plurality of sub-matrices arranged in a block diagonal format. Thereafter, the receiving end transmits the feedback information of the each calculated sub-matrix.

In another aspect of the present invention, a transmitting end receives a precoding matrix in a multi-input, multi-output (MIMO) system. More specifically, the transmitting end requests feedback information of a precoding matrix and in return, receives receiving the feedback information of each diagonal sub-matrix of the precoding matrix. Here, the precoding matrix includes a plurality of sub-matrices arranged in a block diagonal format. Thereafter, the transmitting end transmits data using the precoding matrix along with a confirmation signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
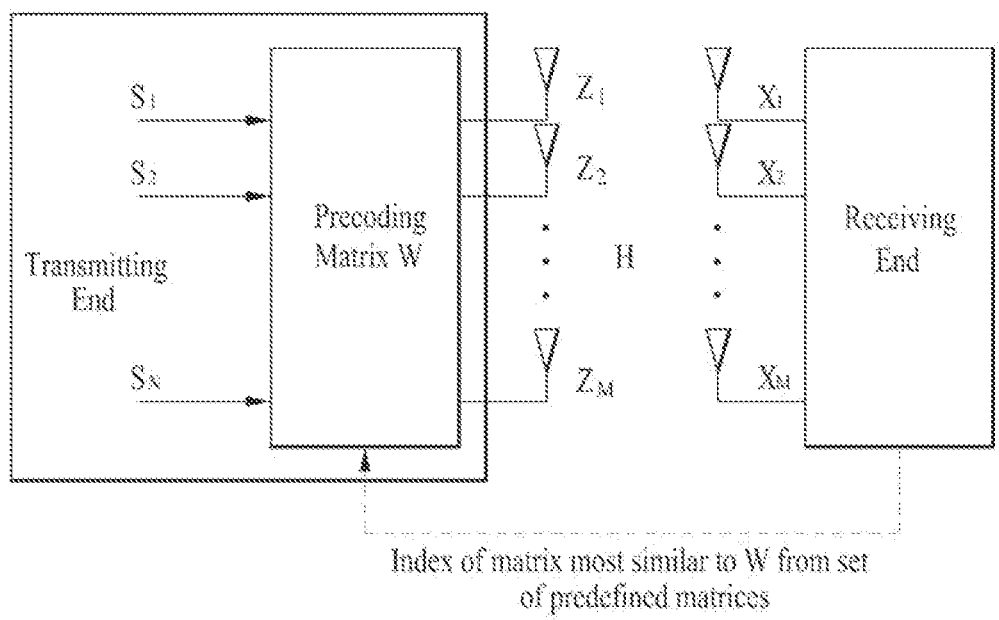
FIG. 1 is an example illustrating a multi-input, multi-output (MIMO) system according to the related art.
Figure 2:
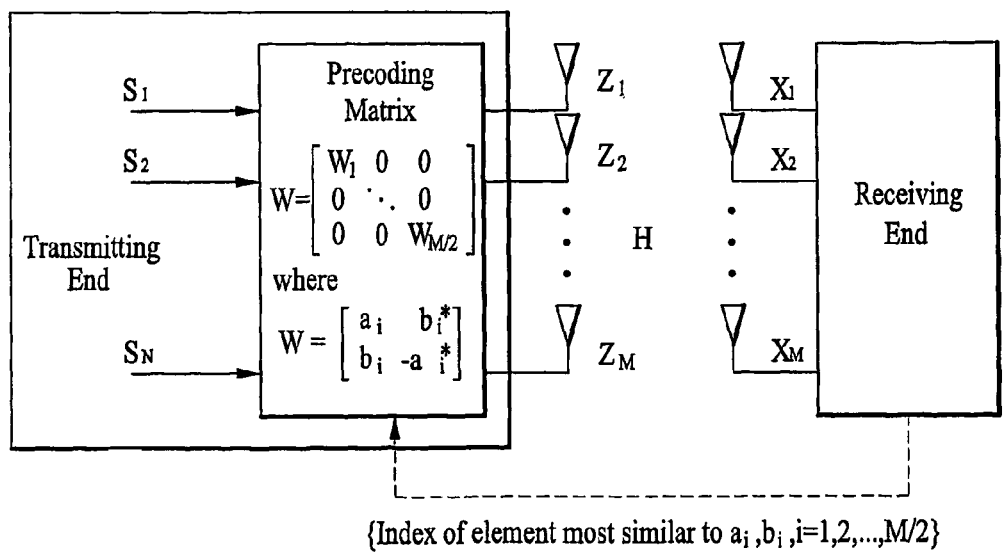
FIG. 2 is an example illustrating a multi-input, multi-output (IMO) system according to the present invention.

FIG. 2 is an example illustrating a multi-input, multi-output (MIMO) system according to the present invention. As illustrated in FIG. 2, W matrix can be illustrated according to Equation 1.

$$W = \begin{bmatrix} W_1 & 0 & 0 \\ 0 & \ddots & 0 \\ 0 & 0 & W_{\frac{M}{2}} \end{bmatrix} \quad \text{[Equation 1]}$$

In Equation 1, $$W_1 = \begin{bmatrix} a_1 & b_1^* \\ b_1 & -a_1^* \end{bmatrix},$$

where a* is a conjugate of a. Furthermore, the sub-matrix W is not limited to a 2×2 format, but can be different-sizes, such as 4×4, 8×8, and 16×16.

In addition, the receiving signal vector x of the receiving end can be expressed according to the following equation.

$$x = HWs + v \quad \text{[Equation 2]}$$

In Equation 2, x is a receiving signal vector, H is a channel matrix, W is a precoding matrix, s is a transmission signal vector before precoding matrix is applied thereto, and v represents white noise $$\begin{bmatrix} a & b^* & 0 & 0 \\ b & -a^* & 0 & 0 \\ 0 & 0 & c & d^* \\ 0 & 0 & d & -c^* \end{bmatrix} \begin{bmatrix} G_1 \\ G_2 \\ G_3 \\ G_4 \end{bmatrix}.$$

In order to acquire the transmission vector s, $W^{-1}H^{-1}$ is multiplied on both sides of Equation 2, which in turn can be expressed as shown in Equation 3.

$$W^{-1}H^{-1}x = s + W^{-1}H^{-1}v \quad \text{[Equation 3]}$$

If $W^{-1}$ and $H^{-1}$ of Equation 3 are expressed as $W^H$ and G, respectively, $W^{-1}H^{-1}$ can be expressed according to Equation 4. Here, G represents a pseudo inverse of H. Moreover, Equation 4 is a different expression of Equation 2 in that in Equation 4, M=4.

$$\begin{bmatrix} a & b^* & 0 & 0 \\ b & -a^* & 0 & 0 \\ 0 & 0 & c & d^* \\ 0 & 0 & d & -c^* \end{bmatrix} \begin{bmatrix} G_1 \\ G_2 \\ G_3 \\ G_4 \end{bmatrix} \quad \text{[Equation 4]}$$

Referring to Equation 1, in Equation 4, the matrix corresponding to $W_1$ is $$w_1 = \begin{bmatrix} a & b \\ b & -a \end{bmatrix}.$$

Furthermore, a precoding matrix corresponding to $W_1$ can be expressed as shown in Equation 5.

$$\begin{bmatrix} a^*G_1 + b^*G_2 \\ bG_1 - aG_2 \end{bmatrix}. \quad \text{[Equation 5]}$$

By using Equation 5, the values of a and b, which satisfy Equations 6 and 7, can be acquired. Furthermore, a and b values can be determined based on a value which most closely satisfies the optimum signal-to-noise ratio (SNR) from the $a_1$ and $b_1$ values.

$$\arg \min(|a_i^*G_i(1) + b_i^*G_i(2)|^2 + |b_iG_i(1) - a_iG_i(2)|^2) \quad \text{[Equation 6]}$$

$$|a_i^*G_i(1) + b_i^*G_i(2)| = |b_iG_i(1) - a_iG_i(2)| \quad \text{[Equation 7]}$$

In Equations 6 and 7, $G_i(j) = 2*(i-1) + G$ signifies jth row of the matrix or jth row of G.

There are two schemes by which the codebook can be configured. More specifically, the first scheme relates to a two-dimensional configuring scheme, and the second scheme relates to a one-dimensional configuring scheme. In the two-dimensional configuring scheme, the codebook is configured by combining the values of a and b, as is the case with {(a, b)}.

On the other hand, the values of a and b are used in Equation 8, and either value, a value or b value, can be used to determine the value of another. Furthermore, Equation 8 represents configuring a codebook by using either a value or b value.

$$|a|^2 + |b|^2 = 1 \quad \text{[Equation 8]}$$

Figure 3:
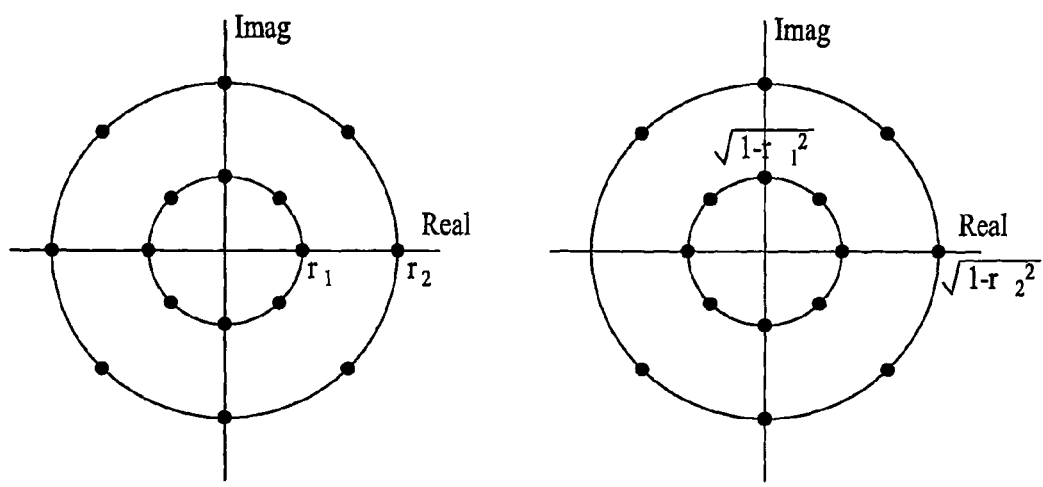
FIG. 3 illustrates an example of configuring a codebook by using characteristics of a and b.

FIG. 3 illustrates an example of configuring a codebook by using characteristics of a and b. As illustrated in Equation 8, Equation 3 can be derived by using the relationship of the values of a and b. That is, the values of a and b within a constellation are located on a unit circle having a radius of 1.

In addition, in order to provide limitations for specified values of a and b, which are used to configure a codebook, it may be necessary to uniformly quantize the values on the unit circle. FIG. 3 is an example of quantizing the values of a and b, and in particular, the values of a and b are quantized on the basis of π/4rad.

As discussed above, the codebook configuration can be simplified by using the quantized a and b values, and consequently, the memory used for storing the codebook can be minimized. Furthermore, a capability of a Bit Error Rate (BER) can be improved when selecting the values of a and b, since a and b values selected have a high or optimum SNR. In addition, referring to the transmitting end, a peak-to-average power ratio of the W matrix having a non-zero value, and not a zero value, only for two elements of each row is lower than the W matrix having all elements represented by non-zero values.

INDUSTRIAL APPLICABILITY

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting a precoding matrix in a multi-input, multi-output (MIMO) system, the method performed at a receiver and comprising:

determining a plurality of non-zero unitary sub-matrices on a diagonal line of the precoding matrix using channel state information with a transmitter, wherein the precoding matrix comprises the plurality of non-zero unitary sub-matrices arranged in a block diagonal format and zero elements, and wherein the precoding matrix is specific to the receiver; and transmitting feedback information to the transmitter, wherein the feedback information indicates all of the plurality of determined non-zero unitary sub-matrices, wherein the precoding matrix is denoted by $$\begin{bmatrix} a & b^* & 0 & 0 \\ b & -a^* & 0 & 0 \\ 0 & 0 & c & d^* \\ 0 & 0 & d & -c^* \end{bmatrix},$$

the plurality of non-zero unitary sub-matrices are denoted by $$\begin{bmatrix} a & b^* \\ b & -a^* \end{bmatrix} \text{ and } \begin{bmatrix} c & d^* \\ d & -c^* \end{bmatrix},$$

a pseudo inverse of a channel matrix is denoted by $$\begin{bmatrix} G_1 \\ G_2 \\ G_3 \\ G_4 \end{bmatrix},$$

and values of a, b, c and d are directly calculated in accordance with following equations:

arg min($|a_i*G_i(1)+b_i*G_i(2)|^2+|b_iG_i(1)-a_iG_i(2)|^2$) and
$|a_i*G_i(1)+b_i*G_i(2)|=|b_iG_i(1)-a_iG_i(2)|$), where, when i=1, $a_i$ equals a, $b_i$ equals b, $G_i(1)$ equals $G_1$, and $G_i(2)$ equals $G_2$, and where, when i=2, $a_i$ equals c, $b_i$ equals d, $G_i(1)$ equals $G_3$, and $G_i(2)$ equals $G_4$.

2. The method of claim 1, wherein directly calculating the values of a, b, c and d comprises quantizing each element of the corresponding non-zero unitary sub-matrix or quantizing the corresponding non-zero unitary sub-matrix.

3. The method of claim 2, wherein quantizing each element of the corresponding non-zero unitary sub-matrix or quantizing the corresponding non-zero unitary sub-matrix is performed in reference to a codebook which includes sampled values of complex numbers.

4. The method of claim 2, wherein quantizing each element of the corresponding non-zero unitary sub-matrix or quantizing the corresponding non-zero unitary sub-matrix is performed in reference to a codebook which includes sampled matrices, the sampled matrices including complex numbers as elements.

5. A method of transmitting and receiving a precoding matrix in a multi-input, multi-output (MIMO) system, the method comprising:

requesting, at a transmitter, feedback information of a precoding matrix from a receiver;

determining, at the receiver, a plurality of non-zero unitary sub-matrices on a diagonal line of the precoding matrix using channel state information with the transmitter, wherein the precoding matrix comprises a plurality of non-zero unitary sub-matrices arranged in a block diagonal format and zero elements, and wherein the precoding matrix is specific to the receiver;

transmitting, at the receiver, feedback information to the transmitter, wherein the feedback information indicates all of the plurality of determined non-zero unitary sub-matrices;

receiving, at the transmitter, the feedback information from the receiver; and transmitting, at the transmitter, data to the receiver using the precoding matrix and a confirmation signal, wherein the precoding matrix is denoted by $$\begin{bmatrix} a & b^* & 0 & 0 \\ b & -a^* & 0 & 0 \\ 0 & 0 & c & d^* \\ 0 & 0 & d & -c^* \end{bmatrix},$$

the plurality of non-zero unitary sub-matrices are denoted by $$\begin{bmatrix} a & b^* \\ b & -a^* \end{bmatrix} \text{ and } \begin{bmatrix} c & d^* \\ d & -c^* \end{bmatrix},$$

a pseudo inverse of a channel matrix is denoted by $$\begin{bmatrix} G_1 \\ G_2 \\ G_3 \\ G_4 \end{bmatrix},$$

and values of a, b, c and d are directly calculated in accordance with following equations:

arg min($|a_i*G_i(1)+b_i*G_i(2)|^2+|b_iG_i(1)-a_iG_i(2)|^2$) and
$|a_i*G_i(1)+b_i*G_i(2)|=|b_iG_i(1)-a_iG_i(2)|$), where, when i=1, $a_i$ equals a, $b_i$ equals b, $G_i(1)$ equals $G_1$, and $G_i(2)$ equals $G_2$, and where, when i=2, $a_i$ equals c, $b_i$ equals d, $G_i(1)$ equals $G_3$, and $G_i(2)$ equals $G_4$.

* * * * *